*INVENTOR.*
HAROLD W. YATES
BY WILLIAM A. PARRILLA

*ATTORNEY*

June 16, 1964  H. W. YATES ET AL  3,137,769
REFLEX SIGHTING

Filed Jan. 24, 1961  2 Sheets-Sheet 2

INVENTOR.
HAROLD W. YATES
WILLIAM A. PARRILLA
BY

*ATTORNEY*

United States Patent Office

3,137,769
Patented June 16, 1964

3,137,769
REFLEX SIGHTING
Harold W. Yates, Stamford, and William A. Parrilla, Bridgeport, Conn., assignors to Barnes Engineering Company, Stamford, Conn., a corporation of Delaware
Filed Jan. 24, 1961, Ser. No. 84,602
3 Claims. (Cl. 178—6.8)

This invention relates to an improved reflex sighting system and more particularly to systems in which the aiming of multiple component systems can be coordinated.

Ordinary reflex sights provide for the projection of aiming or sighting indicia so that the operator sighting through the sight can bring a target to the center of the sight which will then assure that the gun or other object to be aimed is trained on the target. When an ordinary reflex sight is used in order to observe very rapid distant phenomena like the re-entry of a rocket nose cone it is quite inadequate. The inadequacies are of two types, either deficient eye sensitivity or the necessity for coordinating the aiming of more than one device which is practically impossible with an ordinary reflex sight. These are two different aspects of the improvement obtained by present invention and require somewhat different construction and operating principles. It is possible to use both types of the present invention in a single instrument which will be described later otherwise the two aspects are not mutually dependent.

The first requirement which is solved by one variant of the present invention is brought about by the fact that acquisition data is required at levels below the sensitivity of the human eye. This problem will be pointed up in connection with rocket nose cone re-entry although the present invention is in no sense limited to use in the solution of this problem. When a rocket nose cone first encounters thin atmosphere its temperature rises slowly and it is usually at a great distance. The unaided eye will not discern the re-entering nose cone until it has reached a certain brilliance, yet it may have been hot enough to emit visible radiations for several seconds before the eye can see it. The whole phenomenon is occurring at very high speeds and, therefore, the sooner the object can be discerned the greater the chance of aiming the tracking instruments so that they can lock on and the greater amount of data that can be obtained. In the solution of that phase of the problem the present invention uses an image orthicon television camera tube which has a sensitivity much greater than that of the human eye.

The television camera can pick up a re-entering nose cone quite a few seconds before it is visible to the eye. The reflex sight of the present invention superimposes the closed circuit representation of what the television camera sees onto a beam splitting plate of the reflex sight. So stated the instrument of the present invention sounds simple but in order to achieve it requirements which are never encountered in ordinary television operation are essential. It must be remembered that if the operator is going to transfer smoothly from television observation of the nose cone to visual, absolute and unvarying registry of the two images is essential. Regardless of the accuracy of projecting optics this cannot be accomplished by ordinary television design. The visual observation is accurate and undistorted over the whole field which the operator covers. This may be a field of 20 or more degrees in each dimension. The television camera itself can be built with adequate definition on the sensitive surface of the orthicon tube by the ordinary design for precision television camera work. The reproduction of what the camera sees on the cathode ray tube is another story.

The present invention requires an accuracy of registry within 5% or better over a 20° x 20° field of view. This is completely beyond the standards of ordinary television production. The image on the cathode ray tube presupposes an exact following by the electron stream of the corresponding electron stream in the camera. Unfortunately with practical instruments using electro-magnetic deflection the identical wave shape cannot be obtained because of the fairly considerable nonlinear impedance dictated by the inductive component of the deflecting coils. This is particularly serious in vertical deflection because of the long time constant and correspondingly high inductance of the coils. Severe distortion takes place. In ordinary television practice this is compensated, at least partially, by horizontal and vertical linearity controls, centering controls and height and width controls.

Moderate linearity correction is obtained with a suitable output amplifying tube by introducing a distortion which is the opposite of the distortion resulting from the incorrect wave shape. This is generally effected by operating the vertical output tube on a part of its characteristic curve which is not straight. The problem is complicated by the fact that the controls interact and therefore it is necessary to adjust first one control and then another repeating the process until the result comes closer and closer to the desired degree of correction. Once these corrections have been made, however, the television display is at the mercy of drift in supply voltage, characteristics of resistors, capacitors and the like. In ordinary television this presents no serious problem because the picture appears satisfactory even though the distortion may be many times greater than 5%.

In the present invention, where the targets seen by television and the visual image must be superposed, ordinary television circuits and components are not useful. It is necessary to provide for an almost perfectly regulated power supply and resistance, capacitors and other components which change with temperature must each be of the temperature compensating type otherwise the device is useless.

It might be argued that this new and extreme precision of superposition ought not to be necessary. However, the reflex sights of the present invention are useless without extreme precision because of the false target problem. When a nose cone re-enters it is generally accompanied by one or more pieces of the last rocket stage. It is essential that the operator be able to know with complete certainty which piece of material he is tracking and this can only be accomplished by a high degree of precision of superposition of the television and visual images. The instrument must remain in precise calibration and the calibration must hold over the whole of the field of view represented on the cathode ray.

The tracking and recognition problem described above presupposes that all parts of the observing machinery are rigidly interconnected and only a single whole is being aimed. This is not always practical. Often there must be more than one independently aimable component and this is true regardless of whether a high sensitivity television circuit is used to discern objects before the eye can see them or whether the objects are within the range of visual sensitivity. The latter case sometimes presents even greater problems in coordinating aiming. For example, the sight may be used to train more than one gun on the same object or it may be necessary to train other instruments which are not so close together that they constitute a single aiming whole.

In the case of multiple aiming the second modification of the present invention comes into play. Here again the eye looks through an inclined plate which is the classical beam splitter of an ordinary reflex sight. It is further necessary as in ordinary sights to project an aiming configuration, for example, a bulls eye with cross hairs. In addition it becomes necessary to know whether other components which have to be individually aimed are also on target. This is effected by displaying the coordinates of the second component on a cathode ray tube, the face of which is optically, though not physically, coincident with the plane of the indicia. The location of the second component is shown by the movement of a circle on the cathode ray tube face, the circle being of suitable size so that when it is centered in the reflex sight the target can still be pinpointed through it. This requires not only optics in which the plane of sighting indicia and cathode ray tube image are optically sufficiently close so that both are in perfect focus but it requires a different circuitry in the cathode ray tube so that the circle is both in sharp focus and in perfect shape regardless of where it is located on the end of the tube and that its position is exactly proportional to the location of the second component.

It is, of course, possible as has been mentioned above to combine both aspects of the present invention onto a single instrument, thus an instrument which provides for the superposition of a high sensitivity television image on the visual image and for location of an additional separately aimable object to coincide. Obviously, of course, there may be more than one additional separately aimable instrument component but, beyond two or at most three, aiming control becomes difficult for a single operator. The instrument can, however, be multiplexed so that several operators have the same images, one operator effecting the aiming of one component and the other another one.

Where there are multiple images of different components confusion can possibly arise unless there is a contrast. This can be effected geometrically by different shaped representations on the cathode ray tube face, for instance one component could appear as an ellipse and the other as a circle. However, the substantially circular conformation presents so many advantages that a better way is to obtain contrast with different colors. In the case of one aimable component the aiming indicia can be etched in one color and the cathode ray tube phosphor be a different color. If there are to be more than one circle it is necessary to have a color television tube so that the other circles may be in contrasting colors.

The invention will be described in greater detail in conjunction with the drawings in which.

Figure 1:
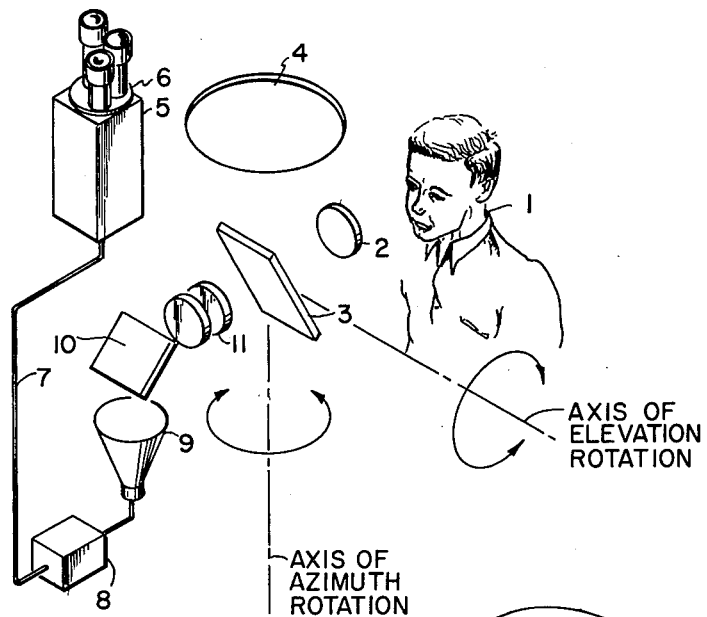
FIG. 1 is a diagrammatic isometric view of a system using a television camera and visual observation.

FIG. 1 illustrates an instrument using combined television and visual observation but having only a single aimable whole. The operator is shown at 1 with a suitable ocular 2. The beam splitter 3 reflects a major portion of the light coming through a direct viewing aperture 4. For example, the reflection may be from 90 to 95%. A television camera 5 with a turret 6 carries three lenses of different focal lengths. The camera output is connected through cable 7 to a closed circuit television receiver 8 having a television display tube 9. The camera electronics and those of the receiver use the usual circuits but as has been pointed out above extreme requirements for freedom of drift of supply voltage and all components which can influence the picture must be drift free to the extent that the final picture will maintain linearity and orientation within better than 5%. The beam from the tube 9 is reflected by a mirror 10 through collimating lenses 11 so that it exactly superimposes the image of the tube and that coming in through the opening 4 on the beam splitter 3. In both cases the light is substantially collimated so that the operator views the images at infinity focus. This provides for maximum accuracy and minimum operator fatigue.

The operator controls the movement of the various instruments which are being aimed preferably in a framework on which he himself rides. The control is through suitable servo motors and is conventional and, therefore, not shown. However, the effects of aiming in azimuth and elevation are illustrated by the two axes shown on FIG. 1.

The controls for the television receiver are carried to a panel accessible to the operator and include focus, horizontal centering, vertical centering, width, height, horizontal linearity, vertical linearity and a control for rotating the whole of the picture on the television tube. These controls are not shown as, with the exception of means for rotating the picture, they are all present in a standard television receiver. The components of the control circuits, however, must have the same degree of freedom from drift as is specified above. Their physical shape and location is a matter of indifference and, therefore, they are not shown.

The operation of the instrument will be described in connection with the operation of tracking a nose cone re-entry although as pointed out above the instrument is not concerned with the origin of its moving targets.

Initially the operator calibrates the instrument. On a clear night this is simply effected by picking two or three prominent stars. These are viewed both by television and by direct observation. The operator adjusts picture brightness and contrast to a comfortable level and then superimposes the images of the stars as projected from the television tube on the images which he sees direct. This will usually involve a very careful use of height, width and linearity controls and may also require adjustment of the focus control for maximum sharpness and the rotation control so that the coordinates of the picture exactly agree with those which the operator sees directly. Once perfectly adjusted, that is to say, within the limits of the controls and in any event to better than 5%, the controls are locked and the instrument is now ready to observe the re-entry.

The operator moves the instrument in azimuth and elevation to a point where the re-entering nose cone will be in the field of view. Everything is turned on and the brightness and contrast of the television receiver adjusted for any changed conditions. When the nose cone re-enters it begins to glow dimly far away. The extremely sensitive television camera first picks it up long before the brightness and color is sufficient for visual observation and the operator can bring the nose cone near the center of the aiming indicia. At this point if there is an automatic tracker the automatic tracking mode can be started. This may either be initiated manually by the operator or automatically by tracker signal. Normally the operator retains the power to override the tracker manually when necessary.

The reentry nose cone will be accompanied by pieces of the last rocket stage and these will appear as separate points of light. The operator decides which object he wants to be automatically tracked. This will often be the nose cone itself although for certain studies he may desire to aim at another piece of the missile. Soon the brilliance of the glowing nose cone or other fragments increases and ordinarily they will come nearer, until they become readily discernible by the naked eye. Preferably there is a color contrast between the phosphor of the cathode ray tube and the natural color of the glowing nose cone. Once the objects become clearly visible to the naked eye the operator may, if he wishes, turn off the television picture or automatic means may be provided in the television receiver to turn itself off beyond a certain predetermined signal level. Thereafter the operator follows the nose cone through its complete re-entry. He is able at any moment to override the automatic tracker if it loses the nose cone or if there is no automatic tracker the operator maintains the tracking manually.

Nose cone re-entry may occur at varying distances. When it is further away the rate of angular change of position per unit time is less but the objects are dimmer. If such a re-entry is anticipated the operator may desire to use a longer focus lens in the television camera in order to reduce the field of view and increase the energy. This he does in the initial calibrating by turning the turret 6 to bring into play the lens of the focal length chosen. Let us assume that this lens has twice the focal length and as a result the field of view will only be 10° instead of 20°, and the picture will fill only the center quarter of the television tube 9. Again the operator calibrates the instrument on several stars and his calibration job will be somewhat easier as the linearity controls are more precise in the center part of the tube. He then proceeds as before but now the nose cone will appear brighter to the television camera and can be discerned at a somewhat greater distance. As the nose cone gets closer it is harder to track and so the visual observation field is not changed. But, when the nose cone is bright enough for visual observation the operator can turn off the television and he now has a wide field so that he can observe events with a minimum chance of error.

Figure 2:
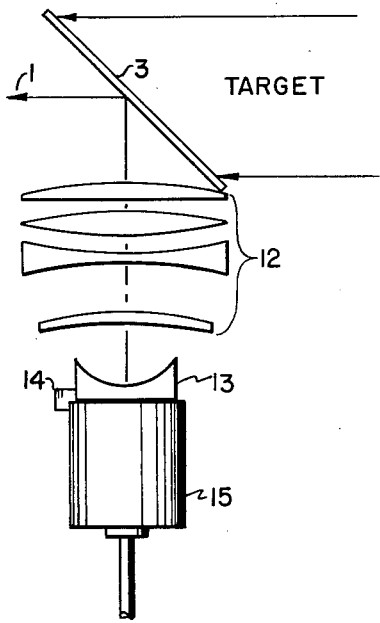
FIG. 2 is a diagram of the optics of a multiple component instrument.

The second mode of operation of the present invention deals with the situation where there is more than one component that is to be individually aimed. This is shown simply in FIGS. 2 and 3 where there is no television observation. The same elements carry the same reference numerals. In FIG. 2 the operator at 1 looks through a beam splitting plate 3. In this case his direct visual observation is through the plate instead of reflected from it as in FIG. 1 and accordingly the plate will ordinarily be designed so that it transmits more easily than it reflects, for example, it may reflect only 5 or 10%. The characteristics are thus the opposite of the plate 3 in FIG. 1.

Long focus collimating optics 12 are provided ending in a planoconvex lens 13. On the bottom face of this there is etched a sighting reticle design, for example, a bulls eye with cross hairs. This lens is edge lighted with a light 14 of suitable color. Closely adjacent, in fact touching the lens 13, is the face of a cathode ray tube of a small oscilloscope 15 preferably having a phosphor of a color contrasting with the color of the edge lighting from the lamp 14. The collimating optics 12 must be chosen with care so that their focal length is sufficient to give a depth of field such that the planes of the flat face of lens 13 and the phosphor on the end of the cathode ray tube are optically co-planar although, of course, physically they are separated by the thickness of the glass face of the cathode ray tube.

Figure 3:
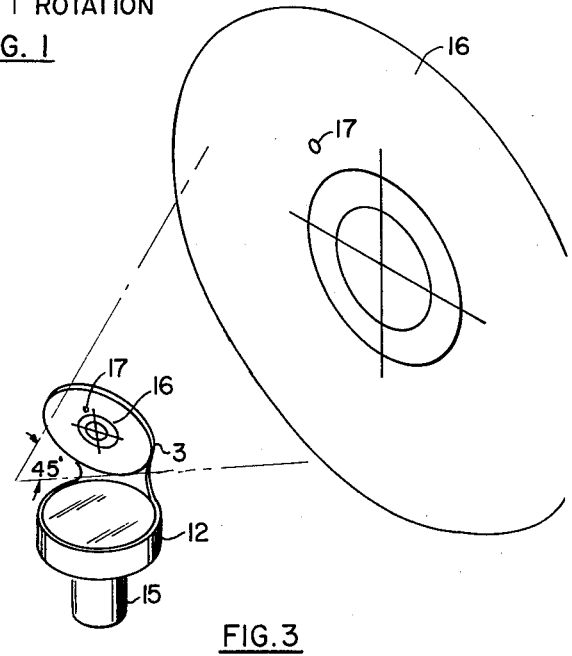
FIG. 3 is a perspective view of the sight of FIG. 2.

The etched aiming indicia 16 are projected onto the plate 3 as is shown in FIG. 3 and because they are projected with collimated light they appear to the operator at a long distance. This illusion is illustrated in FIG. 3 by the large reproduction at 16. Now the operator can aim two portions of his instrument separately, for example, two guns or two cameras. The location of the second component is shown on the face of the cathode ray tube of the oscilloscope 15 by introducing suitable sine waves 90° out of phase. This display appears as a circle which is projected as 17 in FIG. 3. As pointed out above the phosphor of the cathode ray tube is of a different color than the edge lighting of the aiming reticle. For example, the circle may be blue and the edge lighting yellow.

The operator has two controls so that he can aim both the part of the machine on which he is sitting and the other component. Both will be brought to the center and they do not confuse each other because the circle 17 is chosen or adjusted to be sufficiently large so that the target can be seen through it. In the case of automatic tracking it may be sufficient to bring both the circle and the actual target within say the inner circle of the bull's-eye which may represent the range within which automatic tracking is possible. If manual tracking is to be used it is possible to subdivide duties, that is to say, the sights and the oscilloscopes may be duplicated so that two operators both see the same thing, one operator controlling the aiming of one component and the other the other. In the case of only two components to be aimed it is normally feasible and often desirable to have a single operator control. When there are more than two separately aimable components an additional operator may frequently be preferable. The servo controls which the operator or operators use are not a part of the present invention and are of well known design. They are therefore not shown.

Figure 5:
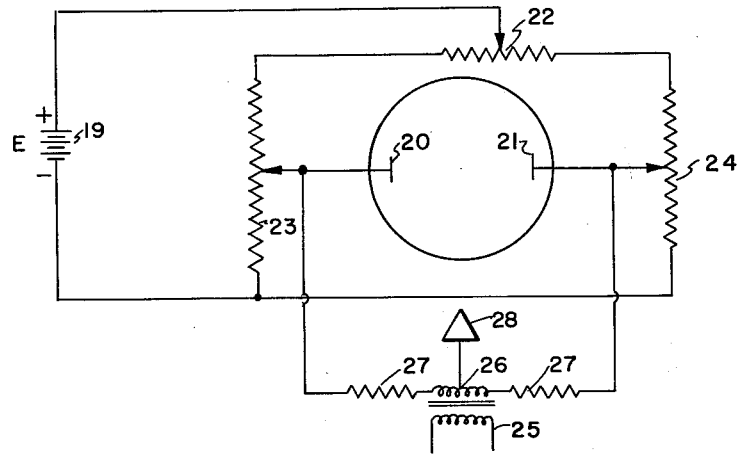
FIG. 5 is a simplified schematic of the deflection circuits in the cathode ray tube of FIGS. 2 to 4.

FIG. 5 illustrates a simplified schematic for the deflection circuits in the oscilloscope 15. As the circuit is the same for each pair of deflection plates only one circuit is shown. In order to maintain the configuration and orientation of the circle corresponding to the second aimable element uniform there is applied to each pair of plates a D.C. voltage which is symbolized in FIG. 5 as a battery 19. This feeds a Wheatstone bridge made up of the two substantially equal potentiometers 23 and 24 and a balancing potentiometer 22 for fine balance. The moving contacts of the potentiometers are connected to the deflecting plates 20 and 21 in the cathode ray tube. When the potentiometers are in their mid positions and the bridge is balanced the two plates are of the same potential and this is maintained for any position so long as the moving arms move equally and in the same direction. These same two points on the bridge are connected to an A.C. signal injecting circuit including a transformer with a primary 25 connected to any suitable source of 60 cycle A.C. The secondary 26 is connected to the two plates of the cathode ray tube through equal resistors 27 which are much larger than the resistors in the bridge, for example, ten times as large. The secondary is center tapped to a voltage point 28 which with the other potentiometers in the oscilloscope results in a central location of the electron beam on the cathode ray tube.

The circuit is duplicated for the other pair of deflection plates except that the same voltage source indicated at 19 may be used for both bridges and it is possible to have a single transformer with one primary and two secondaries. The secondary should be connected so that the two A.C. signals are 90° out of phase and their amplitude is carefully adjusted to equality. This results in a circle appearing on the cathode ray tube the radius of which is determined by the amplitude of the two A.C. voltages and its position on the face by the position of the two potentiometers. The two potentiometers are connected to the separately aimable component so that their movement is proportional to altitude and azimuth differences from the rest of the device. Thus if the second aimable element is exactly aligned the circle will be in the center of the cathode ray tube. The bridge circuits permit a uniform deflection sensitivity over the face of the cathode ray tube of the oscilloscope 15 and the location of the circle thereon is, therefore, an accurate representation of altitude and azimuth coordinates of the separately aimable element.

Figure 4:
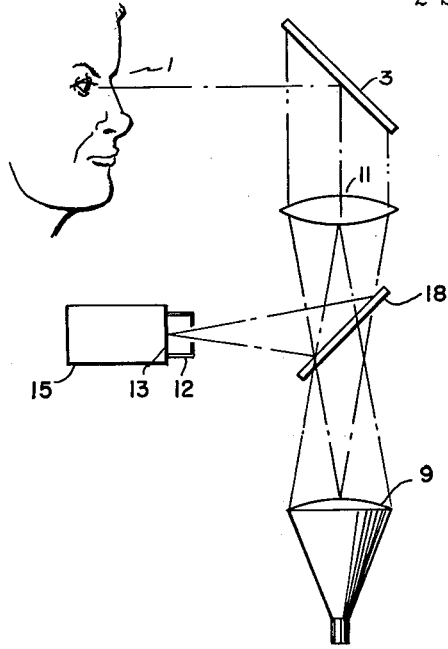
FIG. 4 is a diagram of the optics of a combined television and multiple aimable sight.

FIG. 4 illustrates a combination of television and multiple aiming. Again the same components bear the same reference numerals.

In FIG. 4 the operator is again shown at 1 and he makes direct visual observation through the plate 3. In other words it will have the beam splitting characteristics of the plate in FIGS. 2 and 3 rather than the characteristics of the plate in FIG. 1. All that is needed to combine both television and a multiple aiming is a second beam splitter 18. The picture from the television tube goes through this plate and is collimated by the lens 11. The operation is the same as in FIG. 1 except that here it is the television image that is reflected. To the operator, however, the appearance is the same.

The oscilloscope 15 on which the separately movable component is shown as a circle as in FIGS. 2 and 3 is to one side and the optics 12 and 13 with the aiming reticle etched on the latter are so arranged that in combination with the lens 11 the face of the cathode ray tube of oscilloscope 15 and the etched reticle both appear to the operator as if a long distance away. In other words, the operator sees a picture very similar to that in FIG. 3 only that now he sees in addition the target as shown by the television circuit. Otherwise, the operation is the same as described in the foregoing figures. Again the controls are used to bring both the circle 17 and the target to the center of the bull's-eye. As there are now two cathode ray tubes they should preferably have phosphors of quite different color so that the various images will appear in suitable color contrast.

We claim:

1. A multiple aiming component sighting device for independent sighting and tracking of separate targets comprising,
   (a) a main aimable sighting means comprising a reflex sight,
   (b) at least one additional separately aimable sighting means,
   (c) a cathode ray oscilloscope, fixed in relationship with the reflex sight, and having means for injecting two sine waves of equal amplitude and 90° out of phase to the pairs of deflection plates thereof, whereby a circle of predetermined radius is produced on the cathode ray tube face,
   (d) imaging means comprising a substantially planoconvex element located so closely to the face of the cathode ray tube that its plane surface is optically coplanar with the phosphor of the tube,
   (e) aiming indicia on the said plane surface and means for edge illumination of said indicia in a color contrasting with that of the phosphor of the cathode ray tube,
   (f) said imaging means imaging both the face of the cathode ray tube and the said aiming indicia onto the reflex sight at infinity focus, and
   (g) control means for locating the position of the circle on the cathode ray tube, said control means actuated by the additional sighting means, whereby the position of the circle corresponds to the aiming position of the additional separately aimable sighting means.

2. A sighting device for the observation of phenomena which, at least part of the time, produce target radiations below the observational sensitivity of the human eye, comprising in combination,
   (a) an aimable sighting device and means for aiming it,
   (b) a reflex sight comprising aiming indicia and projecting optics to project the indicia at infinity focus at the reflex sight, the reflex sight being connected to the aimable sighting device so that it is aimed therewith,
   (c) a high sensitivity image orthicon television camera, said camera having a sensitivity in excess of that of the human eye being connected to the sighting device and parallel sighted therewith,
   (d) a closed circuit television receiver connected to the camera output, said receiver having vertical and horizontal centering, linearity, width and height controls, all of the components of each of said controls being temperature compensated so that total variation of all of the controls with temperature and voltage does not exceed 5%,
   (e) the television receiver having a cathode ray output tube and means for imaging the surface of the output tube onto the reflex sight at infinity focus and at substantially the same magnification as the reflex sight, whereby target images from the cathode ray tube and seen directly through the reflex sight are of comparable dimensions.

3. A multiple aiming component sighting device for independent sighting and tracking of separate targets and for observing phenomena which, at least part of the time, produce target radiations below the observational sensitivity of the human eye, comprising in combination
   (a) a main aimable sighting means comprising a reflex sight,
   (b) at least one additional separately aimable sighting means,
   (c) a cathode ray oscilloscope, fixed in relationship with the reflex sight, and having means for injecting two sine waves of equal amplitude and 90° out of phase to the pairs of deflection plates thereof, whereby a circle of predetermined radius is produced on the cathode ray tube face,
   (d) imaging means comprising a substantially planoconvex element located so closely to the face of the cathode ray tube that its plane surface is optically coplanar with the phosphor of the tube,
   (e) aiming indicia on the said plane surface and means for edge illumination of said indicia in a color contrasting with that of the phosphor of the cathode ray tube,
   (f) said imaging means imaging both the face of the cathode ray tube and the said aiming indicia onto the reflex sight at infinity focus,
   (g) control means for locating the position of the circle on the cathode ray tube, said control means actuated by the additional sighting means, whereby the position of the circle corresponds to the aiming position of the additional separately aimable sighting means,
   (h) a high sensitivity image orthicon television camera having a sensitivity in excess of that of the human eye, said camera being connected to the main aimable sighting means and parallel sighted therewith,
   (i) a closed circuit television receiver connected to the camera output, said receiver having vertical and horizontal centering, linearity, width and height controls, all of the components of each of said controls being temperature compensated so that total variation of all of the controls with temperature and voltage does not exceed 5%, and
   (j) the television receiver having a cathode ray output tube and means for imaging the surface of the output tube onto the reflex sight at infinity focus and at substantially the same magnification as the reflex sight, whereby target images from the cathode ray tube and seen directly through the reflex sight are of comparable dimensions.

References Cited in the file of this patent

UNITED STATES PATENTS

| | | |
|---|---|---|
| 2,753,760 | Braymer | July 10, 1956 |
| 2,817,994 | Ehrenhaft | Dec. 31, 1957 |
| 2,887,927 | Newton | May 26, 1959 |
| 2,930,894 | Bozeman | Mar. 29, 1960 |
| 2,937,559 | Shute et al. | May 24, 1960 |
| 2,950,340 | Compton | Aug. 23, 1960 |
| 2,954,427 | Covely | Sept. 27, 1960 |